United States Patent [19]

Noll et al.

[11] Patent Number: 4,745,151

[45] Date of Patent: May 17, 1988

[54] PROCESS FOR THE PRODUCTION OF AQUEOUS DISPERSIONS OF POLYURETHANE POLYUREAS, THE DISPERSIONS OBTAINABLE BY THIS PROCESS AND THEIR USE AS COATING COMPOSITIONS

[75] Inventors: Klaus Noll, Colonge; Jürgen Mosbach, Leverkusen; Josef Pedain, Colonge; Klaus Nachtkamp, Duesseldorf; Jürgen Schwindt, Leverkusen, all of Fed. Rep. of Germany

[73] Assignee: Bayer Aktiengesellschaft, Leverkusen, Fed. Rep. of Germany

[21] Appl. No.: 38,256

[22] Filed: Apr. 14, 1987

[30] Foreign Application Priority Data

Apr. 22, 1986 [DE] Fed. Rep. of Germany ....... 3613492

[51] Int. Cl.$^4$ .............................................. C08L 75/04
[52] U.S. Cl. ...................................................... 524/591
[58] Field of Search .......................................... 524/591

[56] References Cited

U.S. PATENT DOCUMENTS

| | | |
|---|---|---|
| 3,870,684 | 3/1975 | Witt et al. ............................ 260/75 |
| 4,036,801 | 7/1977 | Matsuda ............................. 524/591 |
| 4,066,591 | 1/1978 | Sciven et al. ...................... 260/29.2 |
| 4,203,883 | 5/1980 | Hangauer, Jr. .................... 260/29.2 |
| 4,292,226 | 9/1981 | Wenzel ............................... 524/591 |
| 4,408,008 | 10/1983 | Markusch ........................... 524/591 |
| 4,558,090 | 12/1985 | Drexler .............................. 524/591 |
| 4,622,360 | 11/1986 | Gomi ................................... 524/591 |

*Primary Examiner*—Paul R. Michl
*Attorney, Agent, or Firm*—Gene Harsh; Joseph C. Gil; Thomas W. Roy

[57] ABSTRACT

The present invention is directed to a process for the production of aqueous polyurethane-polyurea dispersions by reacting NCO-prepolymers having an average NCO-functionality of 2 to 2.3 and an average molecular weight of about 700 to about 5000 with organic polyamines having an average amine functionality of 2.05 to about 3 and an average molecular weight of 60 to about 2000 containing primary and/or secondary amino groups at an NCO/NH ratio about 1.05:1 to about 7:1 in the presence of a water-miscible, weakly polar solvent inert to isocyanate groups and having a boiling point at normal pressure below 100° C., converting the resulting solution of the reaction products into an aqueous dispersion by the addition of water and optionally removing the solvent used by distillation, characterized in that the reactants and amounts used are selected such that the resulting reaction products have an NCO-functionality of 2.2 to about 3 and NCO-content of about 0.1 to 5% by weight. The present invention is also directed to the products of this process and their use for the production of coatings.

4 Claims, No Drawings

PROCESS FOR THE PRODUCTION OF AQUEOUS DISPERSIONS OF POLYURETHANE POLYUREAS, THE DISPERSIONS OBTAINABLE BY THIS PROCESS AND THEIR USE AS COATING COMPOSITIONS

BACKGROUND OF THE INVENTION

1. Field of the Invention

This invention relates to a new process for the production of aqueous dispersions of polyurethane polyureas in which polyurethane polyureas containing free isocyanate groups are first prepared in organic solution using selected starting materials in selected quantitative ratios and the resulting solutions are subsequently dispersed in water, to the dispersions obtainable by this process and to their use as coating compositions for hard, inflexible substrates.

2. Description of the Prior Art

Aqueous dispersions of polyurethanes are being used to an increasing extent for the production of lacquer coatings having a high property level. In addition to the lacquering of wood, they are being increasingly used for external applications where high weather resistance and durability are essential. Plastic components for automobiles are already being coated with aqueous air-drying lacquers while their application as a metallic base coat to automobile bodies is a major potential field of application which is attracting considerable interest simply by virtue of the possibility of reducing solvent emission.

Aqueous polyurethane dispersions wherein the solids are based on difunctional units comprising components containing carboxyl groups have been held in readiness for these applications for some years. The carboxylic acid groups are converted with tertiary amines into salt groups which guarantee the dispersibility of the solids and have the particular advantage of gradually losing their ionic character in the final lacquer film through evaporation of the tertiary amine (cf. for example U.S. Pat. No. 4,066,591). This provides the lacquer films with outstanding resistance to water. Unfortunately, dispersions of the type in question are attended by two significant disadvantages, namely, their solvent and weather resistance are poor,
their stability in storage is limited, particularly when the dispersion is intended to be substantially neutral, i.e. to have a pH of about 7.

Efforts to obviate the first disadvantage have led to processes in which polyfunctional units are used, generally in the chain extension of the NCO-prepolymers on which the solids are based (cf. for example U.S. Pat. Nos. 4,203,883 and 3,870,684). However, these dispersions are attended by the disadvantage of inadequate stability in storage. An improvement in this respect was achieved by the incorporation of nonionic hydrophilic groups which partly replace the carboxylate groups of the polyurethane (U.S. Pat. No. 4,408,008). However, the production of aqueous dispersions of branched polyurethanes has previously involved a number of process steps with unfavorable effects.

1. For thorough dispersion in water, the polymers to be dispersed in water should have only a limited viscosity. This precludes in particular the use of more than negligible quantities of chain-branching components. Although the polymers to be dispersed in water may be diluted with high-boiling polar solvents to overcome this viscosity limit, the result in many applications is a significant delay in the drying of the lacquer coatings.

2. Because it competes with the isocyanate/water reaction and particularly because it takes place in a heterogeneous system, chain extension or chain branching in aqueous phase, i.e. addition of the diamines and polyamines to the prepolymer already dispersed in water, has the effect that a residue of unreacted amino groups remains behind, increasing the pH-value of the resulting dispersion to distinctly above 7 and normally to between 8 and 9.0. However, aqueous dispersions having a pH-value in this range are unsuitable for the production of high-quality, aluminium-pigmented metallic lacquer coatings because aluminum is significantly attacked by aqueous systems in this pH-range with formation of aluminum oxide causing the lacquer coating to assume a dull appearance.

Although it is possible to prepare aqueous polyurethane dispersions by the so-called "acetone process," i.e. to synthesize the chain-extended high molecular weight polyurethane in solution in acetone and then to convert the dissolved polyurethane into an aqueous dispersion by mixing the solution with water and distilling off the solvent, known processes for the preparation of aqueous dispersions of branched or crosslinked polyurethanes have never made use of this possibility because it has previously hitherto been regarded as an established fact that the synthesis of a polyurethane in weakly polar, low-boiling solvents, such as acetone, is only possible when difunctional units are almost exclusively used.

Accordingly, an object of the present invention is to provide a new process for the production of aqueous dispersions of amine-extended polyurethanes, i.e. polyurethane polyureas, which in particular combines the following advantages.

1. The process should be workable without the use of highly polar, high-boiling auxiliary solvents.
2. The resulting dispersions should show high stability in storage.
3. The resulting dispersions should be substantially neutral, i.e. should have a pH value of approximately 7.
4. The dispersed polyurethane polyurea should have a certain degree of branching so that the hardness and solvent resistance of the coatings produced from them meet the stringent requirements imposed on these two properties in practice.

This object may be achieved by the process according to the invention which is described in detail hereafter.

SUMMARY OF THE INVENTION

The present invention is directed to a process for the production of aqueous dispersions of polyurethane polyureas by reacting (a) NCO-prepolymers based on (i) organic polyhydroxyl compounds and, optionally, organic monohydroxyl compounds and (ii) excess quantities of organic polyisocyanates and, optionally monoisocyanates with (b) organic polyamines in the presence of a water-miscible, weakly polar solvent inert to isocyanate groups and having a boiling point at normal pressure below 100° C., component (a) and/or component (b) containing carboxylate groups and/or nonionic-hydrophilic groups in a quantity sufficient to guarantee the dispersibility of the end products of the process in water, and subsequent conversion of the resulting solution of the reaction products in the solvent mentioned into an aqueous dispersion by mixing with water, optionally followed by removal of the solvent used by distillation, characterized in that (a) the NCO-prepolymers used are NCO-prepolymers having an average NCO-functionality of 2 to 2.3 and an average molecular weight of about 700 to 5000 and (b) the organic polyamines used are polyamines containing primary and/or secondary amino groups or mixtures thereof having an(average)amine functionality of 2.05 to 3 and an(average)molecular weight of 60 to about 2000 and the reaction is carried out at an equivalent ratio of isocyanate groups in component (a) to amino groups in component (b) of about 1.05:1 to about 7:1, the nature of the reactants and the quantitative ratios between them being selected so that the resulting reaction products have an NCO-functionality of 2.2 to about 3.0 and an NCO-content of about 0.1 to 5.0% by weight.

The present invention is also directed to the dispersions of polyurethane polyureas obtainable by this process.

Finally, the invention is directed to the use of the dispersions of polyurethane polyureas obtainable by this process as coating compositions or for the production of coating compositions for hard, inflexible substrates.

DETAILED DESCRIPTION OF THE INVENTION

The NCO-prepolymers (a) used in the process according to the invention are prepared from the above-mentioned starting component (i) and (ii).

The starting components (i) suitable for the process according to the invention include the relatively high molecular weight polyhydroxyl compounds known from polyurethane chemistry having molecular weights of 300 to about 6000 and preferably of about 500 to 3000, such as dihydroxypolyesters based on dicarboxylic acids such as succinic acid, adipic acid, suberic acid, azelaic acid, sebacic acid, phthalic acid, isophthalic acid, terephthalic acid, tetrahydrophthalic acid, etc., and diols such as ethylene glycol, 1,2-propane diol, 1,3-propane diol, diethylene glycol, 1,4-butane diol, 1,6-hexane diol, 1,8-octane diol, neopentyl glycol, 2-methyl-1,3-propane diol or the isomeric bishydroxymethyl cyclohexanes; polylactones such as the polymers of caprolactone started with the above-mentioned dihydric alcohols; polycarbonates of the type obtained by reaction of the above-mentioned diols for example with diarylcarbonates or phosgene; polyethers such as the polymers and copolymers of tetrahydrofuran, styrene oxide, propylene oxide, ethylene oxide, butylene oxides or epichlorohydrin, preferably propylene oxide, prepared using difunctional starter molecules such as water, the above-mentioned diols or amines containing two NH-bonds. Ethylene oxide may be used provided that the resulting polyether diol contains at most about 10% by weight of ethylene oxide units. It is preferred to use polyether diols which have been obtained without using ethylene oxide, i.e. in particular using only propylene oxide.

In addition to these difunctional compounds of relatively high molecular weight, component (i) may also contain small quantities of trifunctional or higher functional polyhydroxyl compounds of the above-mentioned type, especially polyether polyols wherein the molecular weight lies within the limits indicated and which have been obtained using starting materials of relatively high functionality such as trimethylol propane, glycerol or ethylenediamine.

In addition to these polyhydroxyl compounds of relatively high molecular weight, component (i) may also contain low molecular weight polyhydroxyl compounds having a molecular weight of 62 to 299 in quantities of up to about 75 OH-equivalent-%, based on component (i) as a whole. Compounds of this type include dihydric alcohols of the type previously mentioned and trifunctional or polyfunctional, low molecular weight alcohols such as glycerol, trimethylol propane, trimethylol ethane, the isomeric hexane triols or pentaerythritol.

Component (i) may also include compounds containing carboxylate groups or nonionic hydrophilic groups of the type described hereinafter.

The starting components (ii) are organic polyisocyanates known from polyurethane chemistry which generally have a molecular weight of 112 to 1000, preferably about 140 to 400 and an NCO-functionality of from 2 to 4, preferably 2 to 3. Suitable polyisocyanates include polyisocyanates corresponding to the formula $R(NCO)_n$, wherein R is an organic residue of the type obtained by removal of the isocyanate groups from an organic polyisocyanate having a molecular weight of from 112 to 1000 and preferably of about 140 to 400, and n=2 to 4, preferably 2 or 3. Polyisocyanates particularly suitable for the process according to the invention are those corresponding to the formula wherein R represents a difunctional aliphatic hydrocarbon radical containing 4 to 18 carbon atoms or a difunctional cycloaliphatic hydrocarbon radical containing 5 to 15 carbon atoms. It is possible, although not preferred, to use polyisocyanates wherein R is a difunctional aromatic hydrocarbon radical containing 6 to 15 carbon atoms or an araliphatic hydrocarbon radical containing 7 to 15 carbon atoms. Typical representatives include tetramethylene diisocyanate, hexamethylene diisocyanate, dodecamethylene diisocyanate, 2,2,4-trimethylhexane diisocyanate, undecane-1,11-diisocyanate, lysine ester diisocyanate, cyclohexane-1,3- and -1,4-diisocyanate, 1-isocyanato-3-isocyanatomethyl-3,5,5-trimethylcyclohexane, 4,4'-diisocyanatodicyclohexylmethane and

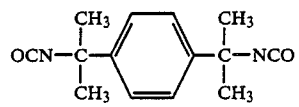

resp. its 1,3-isomer. The polyisocyanates of relatively high functionality which are often used in minor amounts for branching the NCO-prepolymers (a) include triisocyanates containing urethane groups of the type obtained by reaction of the above diisocyanates with substoichiometric quantities of trifunctional, low molecular weight polyhydroxyl compounds of the type mentioned by way of example above, optionally with removal of the excess starting diisocyanate by distillation; polyisocyanates containing isocyanurate groups obtained by trimerization of the diisocyanates mentioned by way of example; or biuret polyisocyanates based on the diisocyanates mentioned by way of example.

The carboxylate groups and/or nonionic hydrophilic groups necessary to guarantee dispersibility in water are preferably incorporated in the end products of the process according to the invention by using starting materials which correspond to component (i) and/or (ii) in the production of the NCO-prepolymers (a). These hydrophilic synthesis components include monoisocyanates and/or monofunctional hydroxyl compounds with hydrophilic chains containing ethylene oxide units or mono- or diisocyanates and/or mono- or polyhydric alcohols containing ionic groups or groups convertible into ionic groups. The synthesis components containing isocyanate groups are incorporated in component (ii) and the alcohols in component (i) during the production of the NCO-prepolymers (a).

Suitable compounds include compounds corresponding to the formula

H-X-Y-R'          (I)

and/or compounds corresponding to the formula

OCN-R-NH-CO-X-Y-R'          (II)

in which:
  R is a difunctional residue obtained by removal of the isocyanate groups from a diisocyanate of the above-mentioned type corresponding to the formula $R(NCO)_n$ wherein $n=2$,
  R' is a monofunctional hydrocarbon radical containing from 1 to 12 carbon atoms, preferably an unsubstituted $C_1$–$C_4$ alkyl group,
  X is a polyalkylene oxide chain containing about 5 to 90, preferably about 20 to 70 chain members, wherein at least about 40%, preferably at least about 65% are ethylene oxide units and which, in addition to ethylene oxide units, may also contain propylene oxide, butylene oxide or styrene oxide units, preferably propylene oxide units, and
  Y is preferably oxygen or even -NR''-, where R'' corresponds in its definition to R.

These monofunctional hydrophilic synthesis components are produced in accordance with DE-OS Nos. 2,314,512 or 2,314,513 or U.S. Pat. Nos. 3,905,929, 3,920,598, or 4,237,264 by alkoxylation of a monofunctional starter, such as n-butanol or N-methylbutylamine, using ethylene oxide and, optionally, another alkylene oxide such as propylene oxide, optionally followed by reaction of the resulting monohydric alcohol corresponding to formula I with a diisocyanate corresponding to the formula $R(NCO)_2$.

Preferred synthesis components containing (potential) carboxylate groups include in particular compounds corresponding to the following general formula

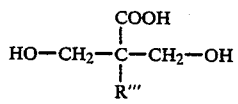

wherein
  R''' is a $C_1$–$C_4$ alkyl group, preferably a methyl group (dimethylol propionic acid).

Instead of using these dihydroxycarboxylic acids, it is also possible to use the corresponding salts, preferably prepared with tertiary amines such as triethylamine, tri-n-butylamine, N,N,N-trimethylcyclohexylamine, N-methylmorpholine, N-methylpiperazine, N,N-dimethylethanolamine, N-methylpiperidine and triethanolamine. Both the free acids and also their amine salts may be added to component (i) in the production of the NCO-prepolymers (a).

To produce the NCO-prepolymers (a), the starting components (i) and (ii) are first prepared by mixing their individual components. The starting components (i) and (ii) are then combined with one another and then reacted at about 50° to 150° C., preferably about 70° to 120° C., optionally in the presence of catalysts known for the isocyanate addition reaction. The quantitative ratios between the starting components are generally selected such that the equivalent ratio of the isocyanate groups in component (ii) to the hydroxyl groups in component (i) is about 1.2:1 to 3.0:1, preferably about 1.5:1 to 2.2:1. In addition, the nature of the reactants and the quantitative ratios between them are generally selected so that the resulting NCO-prepolymers have an average NCO-functionality of 2.0 to 2.3, preferably 2.05 to 2.15 and an NCO-content of about 5 to 15, preferably about 6 to 12% by weight. The amount of low molecular weight polyhydroxyl compounds having a molecular weight of 62 to 299 in component (i) should be calculated such that the resulting end products have a urethane group (-NH-CO-O-) content of about 5 to 20% by weight, preferably about 8 to 15% by weight, based on solids.

The average NCO-functionality of the NCO-prepolymers may be calculated from the number of equivalents (equiv) of isocyanate and hydroxyl groups and the number of moles (mole) of isocyanate or hydroxyl compounds in accordance with the following equation:

$$f = \frac{\Sigma \text{equiv}_{NCO} - \Sigma \text{equiv}_{OH}}{\Sigma \text{mole}_{(NCO\text{-}comp. + OH\text{-}comp.)} - \Sigma \text{equiv}_{OH}}$$

If desired, the production of the NCO-prepolymers (a) may actually be carried out in the presence of the weakly polar, water-miscible, isocyanate-inert solvent boiling below 100° C. under normal pressure which must be present during the subsequent reaction of the components (a) and (b). Acetone and/or methylethylketone are particularly suitable solvents for this purpose.

If the NCO-prepolymers (a) are not produced in the presence of such a solvent, the NCO-prepolymer is dissolved in such a solvent after its production. This solution is then reacted with the polyamine component (b), as described in detail hereinafter.

The polyamine component (b) is a polyamine or a mixture of di- and polyamines having an (average) amine functionality of 2.05 to 3 and an (average) molecular weight of from 60 to about 2000, preferably 60 to about 300. The presence of primary and/or secondary amino groups in the polyamines mentioned is crucial, Figures relating to the amine functionality apply solely to primary and secondary amino groups and not to any tertiary amino groups which may also be present.

Suitable diamines include ethylenediamine, 1,2-and 1,3-diaminopropane, 1,6-diaminohexane, 1,3-diamino-2,2-dimethylpropane, isophorone diamine, 1,3- and 1,4-diaminohexane, 4,4'-diaminodicyclohexylmethane, 4,4'-diamino-3,3'-dimethyldicyclohexylmethane, 1,4-bis-(2-aminoprop-2-yl)-cyclohexane, 3,3'-dimethyl-4,4'-diaminodicyclohexylmethane and mixtures of these diamines.

Suitable polyamines of relatively high functionality include tri- or tetramines such as diethylenetriamine, triethylenetetramine, dipropylenetriamine, tripropylenetetramine, hydrogenated adducts of acrylonitrile with aliphatic or cycloaliphatic diamines (preferably corresponding addition compounds of an acrylonitrile group with one molecule of a diamine) hexamethylene propylenetriamine, tetramethylene propylenetriamine, isophorone propylenetriamine, 1,4- or 1,3-cyclohexane propylenetriamine and mixtures of these polyamines. In addition to these low molecular weight polyamines having a molecular weight of up to 300, it is also possible in principle to us polyamines of relatively high molecular weight, so that component (b) has an average molecular weight of up to 2000. Suitable relatively high molecular weight polyamines of this type include the known polyether polyamines obtained by conversion of the hydroxyl groups of above-mentioned polyether polyols into primary amino groups. However, less preference is attributed to the use of these relatively high molecular weight polyamines.

As already mentioned, hydrophilic segments may also be incorporated in the end products of the process according to the invention by way of the polyamine component (b), although this is a less preferred variant for the incorporation of hydrophilic groups. In such a case, tertiary amine salts of diaminocarboxylic acids corresponding to the following formula are added to the polyamine component (b).

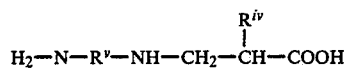

In this formula, $R^{iv}$ represents hydrogen or a $C_1$–$C_4$ alkyl group, preferably hydrogen or a methyl group, and $R^v$ represents a $C_2$–$C_{18}$, preferably $C_2$–$C_6$ alkylene group. In this case, too, suitable tertiary amines are those mentioned by way of example above.

The nature and quantity of the synthesis components containing carboxyl or carboxylate groups or nonionic-hydrophilic groups present in the individual components (i), (ii) and/or (b) and the degree of neutralization of any carboxyl groups present are generally selected so that the end products of the process according to the invention contain, based on solids, 0 to about 100, preferably about 0.4 to 100 and most preferably about 0.4 to 40 milliequivalents per 100 g of carboxylate groups and 0 to about 10% preferably about 2 to 10% and most preferably about 2 to 8% by weight of ethylene oxide units, —$CH_2$—$CH_2$—$O$— incorporated in terminal or lateral polyether chains, the total quantity of these hydrophilic groups being sufficient to guarantee dispersibility of the end products of the process in water. In extreme cases, this dispersibility in water may be guaranteed by the sole presence of carboxylate groups or by the sole presence of the above mentioned ethylene oxide units. However, both ionic groups and also non-ionic hydrophilic groups of the type mentioned may be present in the end products of the process according to the invention.

The nonionic hydrophilic groups are preferably terminal polyether chains containing ethylene oxide units. The terminal arrangement of this group is made possible by the use of monofunctional synthesis components corresponding to formulae (I) and (II) above. However, it is also possible in principle, although far less preferred. to use diols having lateral polyether chains containing alkylene oxide units of the type disclosed in U.S. Pat. Nos. 3,905,929 or 4,190,566 as part of component (i) and/or diisocyanates having lateral polyether chains containing ethylene oxide units of the type described in U.S. Pat. Nos. 3,920,598 or 4,190,566 as part of component (ii) instead of these monofunctional nonionic hydrophilic synthesis components. The result of this would be that the nonionic hydrophilic polyether chains would be laterally incorporated in the end products of the process according to the invention. In that case, the figures relating to the content of ethylene oxide units apply to these terminally arranged polyether chains. However, ethylene oxide units arranged within the polymer backbone of the type incorporated when polyether diols containing ethylene oxide units are used, do not enter into the calculation for the content of ethylene oxide units in the process products.

The above described solutions of the NCO-prepolymers (a), which generally have a solids content of about 20 to 50% by weight, are reacted with the polyamines, optionally after at least partial neutralization of any carboxyl groups present with tertiary amines. This reaction is generally carried out at about 10° to 50° C., preferably about 15° to 35° C. In the reaction the quantitative ratios between components (a) and (b) are selected so as to produce an equivalent ratio between the isocyanate groups in component (a) and the primary and/or secondary amino groups in component (b) of about 1.05:1 to 7:1, preferably about 1.15:1 to 4:1 and most preferably about 1.3:1 to 2.5:1. The functionality and quantity of the polyamine component (b) is gauged so that the resulting polyurethane polyureas still contain free isocyanate groups because of the NCO-excess used and have an average NCO-functionality of 2.2 to about 3.0, preferably of 2.2 to 2.6 and an NCO-content of about 0.1 to 5.0, preferably about 0.5 to 4.5% by weight. The polyamines (b) are preferably used in the form of about 5 to 25% by weight aqueous solutions.

The average NCO-functionality of the polyurethane polyureas may be calculated from the number of equivalents of NCO-groups in the prepolymers of component (a), the number of equivalents of primary or secondary amino groups in component (b) and the number of moles of NCO-prepolymers and polyamines used in accordance with the following equation:

$$f = \frac{\Sigma\text{equiv}_{NCO} - \Sigma\text{equiv}_{OH}}{\Sigma\text{mole}_{(NCO\text{-}comp.+>NH\text{-}comp.)} - \Sigma\text{equiv}_{>NH}}$$

or, based on the starting materials used at the beginning, i.e. from the number of equivalents of isocyanate groups in component (ii), the number of equivalents of hydroxyl groups in component (i) and amino groups in component (b) and the number of moles of starting compounds (i), (ii), and (b) used in accordance with the following equation:

$$f = \frac{\Sigma\text{equiv}_{NCO} - \Sigma\text{equiv}_{(OH+>NH)}}{\Sigma\text{mole}_{(NHO\text{-}comp.+OH\text{-}comp.+>NH\text{-}comp.)} - \Sigma\text{equiv}_{(OH+>NH)}}$$

The reaction of the isocyanate groups in the NCO-prepolymers (a) dissolved in the above-mentioned solvent with the water optionally introduced together with polyamine (b) is of minimal significance compared with the NCO/NH-reaction and, accordingly, is not taken into account in the calculation of the NCO-contents and the NCO-functionality of the reaction products.

The upper limit of the NCO-functionality of the polyurethane polyureas of about 3.0 may be regarded as a limiting value which may be subjected to slight variations and which depend essentially on the contribution made by the individual components to the solubility in the solvent selected. Thus, it may be higher for example when alkyl-substituted cycloaliphatic diisocyanates are used than when straight-chain aliphatic diisocyanates are used. In general, the functionality limit is the value at which, even 15 minutes after addition of the amine chain-extending agent, the solution of the polyurethane polyurea has not gelled or is at most slightly cloudy, but may readily be converted with water into a dispersion. The intrinsic viscosity is reached at around about 5000 mPas after dispersion the viscosity of the polyurethane urea solution is less than about 1000 mPas.

On the other hand, the viscosity of the polyurethane polyurea solution cannot be reduced as required by dilution with the solvent because solids concentrations of less than about 20% by weight generally result in incomplete dispersion in the water when it is subsequently added. The quantity of solvent should be selected so that the solution of the chain-extended polyurethane polyurea has a solids content of about 20 to 50% by weight, preferably about 25 to 40% by weight.

The dissolved polyurethane polyurea is dispersed by addition of water with intensive mixing, for example by stirring, at a maximum temperature of about 50° C., preferably at a maximum of 35° C., preferably within at most 15 minutes after the chain-extending reaction. Addition of and mixing with the water is preferably followed by removal of the solvent by distillation. The quantity of water is selected so that aqueous dispersions having a solids content about 10 to 60% by weight, preferably about 20 to 45% by weight, are obtained after removal of the solvent. After the dissolved polyurethane polyurea has been mixed with the water, the isocyanate groups present therein react with the water to form the high molecular weight polyurethane polyurea. The particle size of the dispersed polyurethane polyureas is generally about 10 to 1000 nm, preferably about 50 to 500 nm.

The dispersions may be blended with other ionic or nonionic dispersions such as polyvinyl acetate, polyethylene, polystyrene, polybutadiene, polyvinylchloride, polyacrylate and copolymer dispersions. It is also possible, although not necessary, to add the known external, preferably ionic, emulsifiers.

Fillers, plasticizers, pigments, carbon black and silica sols, aluminum, clay and asbestos dispersions may also be incorporated in the dispersion.

The dispersions are stable in storage and may be formed at any later stage. They are suitable as coating compositions or for the production of coating compositions for substrates of any type, but preferably for hard, inflexible substrates.

The usual auxiliaries and additives may be added to the dispersions according to the invention before they are used in accordance with the invention. The auxiliaries and additives include crosslinking agents such as carbodiimides, blocked diisocyanates and also partially or completely etherified melamine resins, pigments particularly metallic pigments based on aluminum flakes, fillers (such as carbon black, silica, talcum, kaolin, titanium dioxide, glass in the form of powder or fibers, cellulose or cellulose acetobutyrate) or, to increase the film-forming temperature and specifically to delay drying, coalescence solvents such as diacetone alcohol, N-methyl-pyrrolidone, 1-methoxypropanol, cyclohexanone, ethylene glycol monobutyl ether or diethylene glycol monobutyl ether, although they are only added in small quantities (less than 5% by weight, based on the dispersion).

The dispersions may be processed to form coatings by any of the usual methods, for example by roll coating, knife coating, spread coating, casting, spray coating or dip coating. The dispersions may be processed at room temperature or elevated temperature; there is generally no need to use coalescence solvents, which has the desirable effect of accelerating drying. The coatings obtained reach their final surface hardness, which in may cases is far in excess of 100 seconds (Konig pendulum hardness) in a very short time.

In the following examples, all quantities in "parts" are parts by weight and all quantities in "%" percentages by weight.

EXAMPLES

EXAMPLE 1

620.5 parts of a polyester of adipic acid and hexane-1,6-diol and 2,2-dimethylpropane-1,3-diol (molar ratio 0.65:0.35), OH number 66, were mixed with 31.5 parts butane-1,4-diol, 43 parts of a polyether based on a mixture of 83% ethylene oxide and 17% propylene oxide and started with n-butanol (OH number 26), 40.2 parts 2,2-dimethylol propionic acid and 13.4 parts trimethylol propane and reacted at 70 to 110° C. with 488.4 parts 3-isocyanatomethyl-3,5,5-trimethylcyclohexylisocyanate (IPDI) until the NCO-content of the resulting NCO-prepolymer (a) had fallen to about 6.7 (NCO:OH equivalent ratio 1.87:1).

The prepolymer formed was dissolved in 2420 parts acetone and 30.3 parts triethylamine were added to the resulting solution at room temperature. A solution was prepared from 24 parts ethylenediamine, 10.3 parts diethylenetriamine and 310 parts deionized water and added to the prepolymer solution with stirring over a period of 5 minutes (NCO:NH equivalent ratio 1.28:1). After stirring for 15 minutes, 2110 parts deionized water were added with intensive stirring. This resulted in the formation of a bluish opaque dispersion of the solid in a mixture of water and acetone from which the acetone was removed by distillation under reduced pressure.

A purely aqueous dispersion having a solids content of 35% remained behind. Characteristic data:
NCO-content of the NCO-prepolymer: 6.96%
NCO-functionality of the prepolymer: 2.08
NCO-functionality of the chain-extended polyurethane polyurea (disregarding an NCO/water reaction possibly taking place to a minor extent): 2.47
NCO-content of the chain-extended NCO-prepolymer (disregarding the NCO/water reaction taking place to a minor extent): 3.07%
Content of ethylene oxide units in the dispersed solid: 2.64%
Content of carboxylate groups in the dispersed solid: 23.1 milliequivalents per 100 g
Content of urethane groups in the dispersed solid: 10.65%

EXAMPLE 2

A prepolymer having an isocyanate content of approximately 6.1 was prepared as in Example 1 from 612 parts of the adipic acid polyester described in Example 1, 27 parts butane-1,4-diol, 43 parts of the n-butanol-started polyether described in Example 1, 40.2 parts dimethylol propionic acid, 26.8 parts trimethylol propane and 488.4 parts IPDI (NCO:OH equivalent ratio 1.73:1). The prepolymer thus prepared was dissolved in 2420 parts acetone and 30.3 parts triethylamine were added to the resulting solution at room temperature.

Chain extension was carried out as in Example 1 with a solution of 30 parts ethylenediamine and 5.15 parts diethylenetriamine in 30 parts water (NCO:NH-equivalent ratio 1.19:1). After a dispersion was formed with 2730 parts water, the acetone was removed by distillation which resulted in a bluish-white dispersion having a solids content of 30%. Characteristic data:

NCO-content of the NCO-prepolymer: 6.3%
NCO-functionality of the prepolymer: 2.21
NCO-content of the chain-extended prepolymer (disregarding the NCO/water reaction taking place to a minor extent): 2.29%
NCO-functionality of the chain-extended prepolymer (disregarding the NCO/water reaction taking place to a minor extent): 2.96
Content of ethylene oxide units in the dispersed solid: 2.7%
Content of carboxylate groups in the dispersed solid: 23.0 milliequivalents per 100 g
Content of urethane groups in the dispersed solid: 11.5%

EXAMPLE 3

The prepolymer described in Example 2 was dissolved in 2410 parts acetone and 30.3 parts triethylamine were added to the resulting solution at room temperature. Chain extension was carried out as in Example 1 with a solution of 36 parts ethylenediamine in 320 parts water (NCO:NH equivalent ratio 1.55:1). After the addition of 2100 parts water, a bluish opaque dispersion was formed which had a solids content of 35% after removal of the acetone by distillation. Characteristic data:

NCO-content of the prepolymer: 6.3%
NCO-functionality of the prepolymer: 2.21
NCO-content of the chain-extended prepolymer (disregarding the NCO/water reaction taking place to a minor extent): 2.13%
NCO-functionality of the chain-extended prepolymer (disregarding the NCO/water reaction taking place to a minor extent): 2.75
Content of ethylene oxide units in the dispersed solid: 2.64%
Content of carboxylate groups in the dispersed solid: 23 milliequivalents per 100 g
Content of urethane groups in the dispersed solid: 11.50%

EXAMPLE 4

The prepolymer described in Example 2 was dissolved in 2370 parts acetone and 30.3 parts triethylamine were added to the resulting solution. Chain extension was carried out as in Example 1 with a solution of 10.3 parts diethylenetriamine in 100 parts water (NCO:NH equivalent ratio 6.20:1). After 2270 parts water had been stirred in, a bluish transparent dispersion was formed which had a solids content of 35% after removal of the acetone by distillation. Characteristic data:

NCO-content of the prepolymer: 6.3%
NCO-functionality of the prepolymer: 2.21
NCO-content of the chain-extended prepolymer (disregarding the NCO/water reaction taking place to a minor extent): 5.13%
NCO-functionality of the chain-extended prepolymer (disregarding the NCO/water reaction taking place to a minor extent): 2.44
Content of ethylene oxide units in the dispersed solid: 2.7%
Content of carboxylate groups in the dispersed solid: 23.5 milliequivalents per 100 g
Content of urethane groups in the dispersed solid: 11.73%

EXAMPLE 5 (Comparison)

The prepolymer described in Example 2 was dissolved in 2410 parts acetone and 30.3 parts triethylamine were added to the resulting solution. A solution of 30.9 parts diethylene triamine in 270 parts water wa prepared and rapidly added to the prepolymer solution (NCO:NH equivalent ratio 2.07:1). The viscosity began to increase only 10 seconds after the first addition, the solution rapidly became highly viscous and cloudy and ultimately solidified into gel-like, tough lumps. Dispersions in water was no longer possible. The calculated functionality of the chain-extended prepolymer was 4.

EXAMPLE 6

A prepolymer having an isocyanate content of approximately 6.7% was prepared as in Example 1 from 612 parts of the adipic acid polyester described in Example 1, 27 parts butane-1,4-diol, 43 parts of the n-butanol-started polyether described in Example 1, 40.2 parts dimethylol propionic acid, 20.1 parts trimethylol propane and 488.4 parts IPDI. The prepolymer was dissolved in 2400 parts acetone and 30.3 parts triethylamine were added to the resulting solution. Chain extension was carried out as in Example 1 with a solution of 24 parts ethylenediamine and 5.15 parts diethylenetriamine in 270 parts water (NCO:NH equivalent ratio 2.1:1). After the addition of 2780 parts water, an opaque dispersion was formed which had a solids content of 30% after removal of the acetone by distillation. Characteristic data:

NCO-functionality of the prepolymer: 2.14
NCO-functionality of the chain-extended prepolymer (disregarding the NCO/water reaction taking place to a minor extent): 2.41
Content of ethylene oxide units in the dispersed solid: 2.67%
Content of carboxylate groups in the dispersed solid: 23.25 milliequivalents per 100 g.

EXAMPLE 7

The prepolymer described in Example 6 was dissolved in 2400 parts acetone and 30.3 parts triethylamine were added to the resulting solution. Chain extension was carried out with a solution of 18 parts ethylenediamine and 10.3 parts diethylenetriamine in 260 parts water (NCO:NH equivalent ratio 2.23:1). After addition of 2750 parts water, a blue-tinged, almost transparent dispersion was formed which had a solids content of 30% after removal of the acetone by distillation. Characteristic data:

Content of ethylene oxide units: 2.67%
Content of carboxylate groups —COO—: 1.02%

NCO-functionality of the chain-extended prepolymer (disregarding the NCO/water reaction taking place to a minor extent): 2.52

EXAMPLE 8 (Comparison)

The prepolymer described in Example 6 was dissolved in 2425 parts acetone and, after the addition of 30.3 parts triethylamine at room temperature, the resulting solution was mixed for 60 seconds with a solution of 30 parts ethylenediamine and 15.45 parts diethylenetriamine in 400 parts water. Towards the end of the addition, the viscosity of the solution began to rise appreciably and about 90 seconds after the end of the reaction, the solution solidified to form white, jellylike lumps. Dispersion in water was no longer possible.

The calculated functionality of the chain-extended NCO-prepolymer (disregarding the NCO/water reaction taking place to a minor extent) was 4.

EXAMPLE 9

A prepolymer having an isocyanate content of approximately 8.4% was prepared as in Example 1 from 615.4 parts of the adipic acid polyester described in Example 1, 31.5 parts butane-1,4-diol, 43 parts of the n-butanol-started polyether described in Example 1, 40.2 parts dimethylol propionic acid, 13.4 parts trimethylol propane and 555 parts IPDI. The prepolymer was dissolved in 2565 parts acetone and 30.3 parts triethylamine were added to the resulting solution at room temperature. Chain extension was carried out as in Example 1 with a solution of 42 parts ethylenediamine and 10.3 parts diethylenetriamine in 400 parts water (NCO:NH equivalent ratio 1.56:1).

After a dispersion was formed with 2165 parts water and the acetone was removed by distillation, a bluish white dispersion having a solids content of 30% resulted. Characteristic data:
NCO-functionality of the prepolymer: 2.06
NCO-functionality of the chain-extended NCO-prepolymer (disregarding the NCO/water reaction taking place to a minor extent): 2.47%
Content of ethylene oxide units in the dispersed solid: 2.49%
Content of carboxylate groups in the dispersed solid: 23.0 milliequivalents per 100 g

EXAMPLE 10

The prepolymer described in Example 9 was dissolved in 2575 parts acetone and 30.3 parts triethylamine were added to the resulting solution at room temperature. Chain extension was carried out as in Example 1 with a solution of 48 parts ethylenediamine and 10.3 parts diethylenetriamine in 540 parts water (NCO:NH equivalent ratio 1.4:1). After the addition of 2035 parts water, a bluish white dispersion was formed which had a solids content of 35% after removal of the acetone by distillation. Characteristic data:
Functionality of the chain-extended NCO-prepolymer (disregarding the NCO/water reaction taking place to a minor extent): 2.63
Content of ethylene oxide units in the dispersed solid: 2.48%
Content of carboxylate groups in the dispersed solid: 21.6 milliequivalents per 100 g

EXAMPLE 11 (Comparison)

The prepolymer described in Example 9 was dissolved in 2590 parts acetone and 30.3 parts triethylamine were added to the resulting solution at room temperature. A solution of 42 parts ethylenediamine and 20.6 parts diethylenetriamine in 540 parts water (NCO:OH equivalent ratio 1.33:1) was added over a period of 60 seconds. Although the viscosity of the solution began to rise considerably towards the end of the addition, it was possible immediately afterwards to stir 2050 parts water into the solution over a period of 10 seconds. The dispersion formed was white and coarse and agglomerated after stirring for about 15 minutes to form a cheese-like mass.

The calculated functionality of the chain-extended NCO-prepolymer (disregarding the NCO/water reaction taking place to a minor extent) was 3.51.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous polyurethane polyurea dispersion which comprises reacting
   (a) an NCO-prepolymer having an average NCO-functionality of 2 to 2.3, an average molecular weight of about 700 to 5000 and prepared from (i) organic polyhydroxyl compounds and, optionally, organic monohydroxyl compounds and (ii) an excess quantity of organic polyisocyanates and, optionally monoisocyanates with
   (b) organic polyamines having an (average) amine functionality of 2,05 to about 3, an (average) molecular weight of 60 to about 2000 and containing primary or secondary amino groups or mixtures thereof at an equivalent ratio of isocyanate groups of component (a) to the amino groups of component (b) of 1.05:1 to about 7:1, in the presence of a water-miscible weakly polar solvent inert to isocyanate groups and having a boiling point at normal pressure below 100° C., either component (a) or component (b) or both containing carboxylate groups and/or nonionic hydrophilic groups in a quantity sufficient to guarantee the dispersibility of said polyurethane polyurea in water, subsequently converting the resulting solution of the reaction product in solvent into an aqueous dispersion by adding water and optionally removing the solvent by distillation, characterized in that the reactants and the quantitative ratios used are selected such that the resulting reaction products have an NCO-functionality of 2.2 to about 3 and an NCO-content of about 0.01 to 5% by weight.

2. The process of claim 1 wherein the average molecular weight of the organic polyhydroxyl compound (i) and the amounts of (i) and (ii) are selected so that the resulting reaction products contain about 5 to 20% by weight of urethane groups.

3. A process for the production of a coated substrate which comprises
   (1) preparing an aqueous polyurethane polyurea dispersion in accordance with claim 1 and
   (2) applying a coating composition comprising the aqueous polyurethane polyurea dispersion prepared in step 1) to a substrate and curing said coating.

4. The process of claim 3 wherein said substrate is a hard, inflexible substrate.

* * * * *